J. W. TALLEY.
Seed-Sower.
No. 161,991.  Patented April 13, 1875.
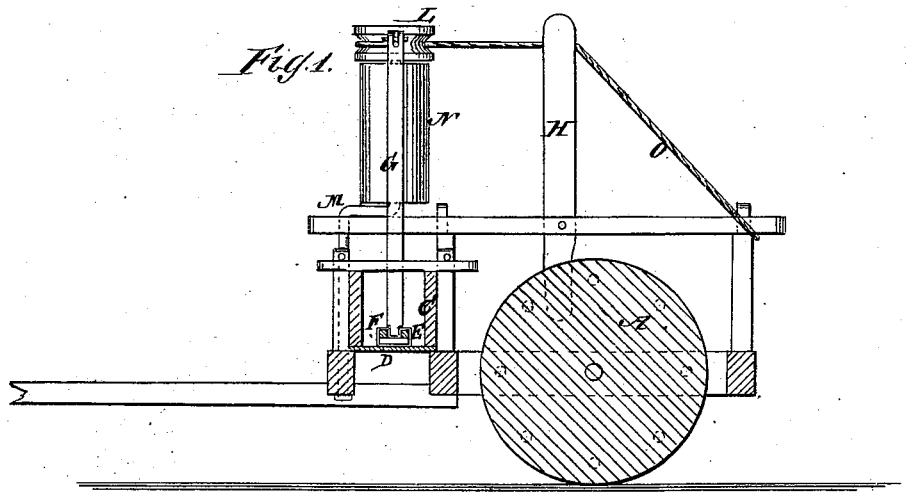
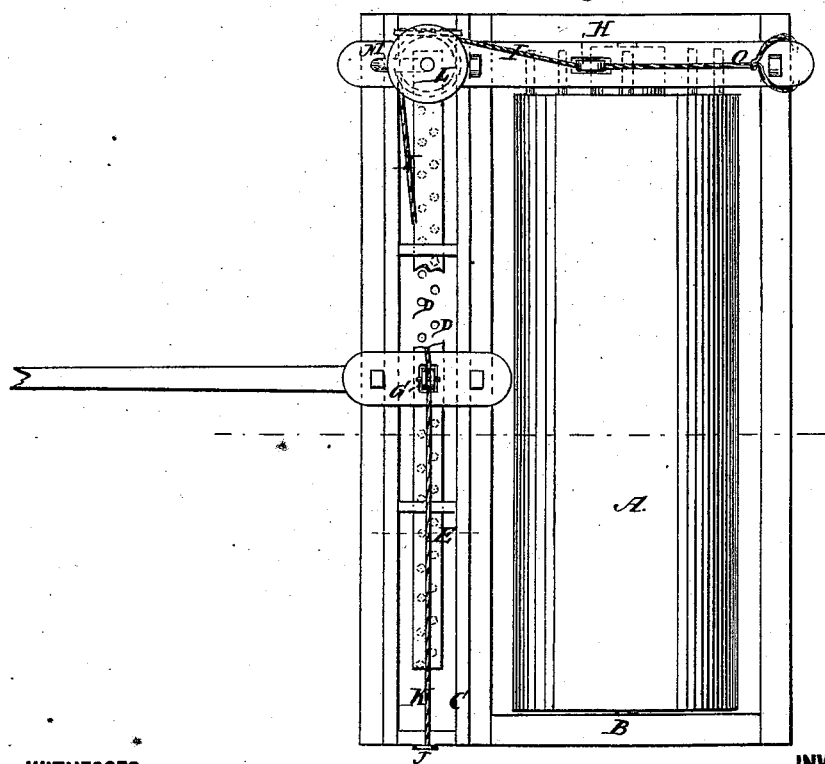
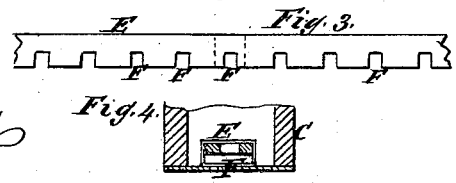
WITNESSES:  
E. Wolff  
A. F. Terry
INVENTOR:  
J. W. Talley  
BY  
ATTORNEYS.

UNITED STATES PATENT OFFICE.

JOHN W. TALLEY, OF PAXTON, ILLINOIS, ASSIGNOR TO HIMSELF AND THOMAS W. BUELL, OF SAME PLACE.

IMPROVEMENT IN SEED-SOWERS.

Specification forming part of Letters Patent No. 161,991, dated April 13, 1875; application filed January 30, 1875.

*To all whom it may concern:*

Be it known that I, JOHN W. TALLEY, of Paxton, in the county of Ford and State of Illinois, have invented a new and Improved Seed-Sower, of which the following is a specification:

The invention consists of a vertical lever for working the slide, which is moved in one direction by a vertical lever at the end of the roller or the side of a truck-wheel, so as to be operated by tappets thereon, and connected to the slide lever by a rope going around a guide-pulley at one corner of the machine, and in the other direction the slide-lever is worked by a spring, which is forced as the tappets escape from the lever. A stop-cord is connected to the tappet-lever to prevent the spring from throwing it and the slide-lever too far.

The machine is designed for sowing grass, flax, and other small seeds, and will generally be used with a roller for smoothing the ground at the same time; but it may be used with wheels.

Figure 1 is a sectional elevation of my improved machine, taken on the line $x\ x$ of Fig. 2. Fig. 2 is a plan view, and Figs. 3 and 4 are details of the seed-box and slide.

Similar letters of reference indicate corresponding parts.

A is the roller; B, the frame; C, the seed-box; D, the holes in the bottom of the seed-box; E, the reciprocating slide; F, the transverse grooves in the slide for feeding the seed to the holes; G, the slide-lever; H, the tappet-lever; I, the cord connecting them; L, the guide-pulley for cord I; J, the spring, and K the cord connecting the slide-lever and spring. The pulley is arranged on a rod, M, for its support, with an upright rod, N, of wood under it to keep it in place.

The bottom of the box may be contrived in two parts to adjust one or both, and thus alter the size of the hole as may be wanted.

To prevent the spring from pulling the slide and the tappet-lever too far back, the latter is connected by a stop-cord, O, with the rear part of the frame.

This contrivance affords a very cheap, and at the same time an efficient, motion for a seed-dropper.

The machine may be attached to cultivators, or any other machine running on wheels.

Having thus described my invention, I claim as new and desire to secure by Letters Patent—

The combination, with the seed-slide and roll having end tappets, of the cord-connected levers G H, intermediate pulley L, and vertical end spring H, as and for the purpose specified.

JOHN W. TALLEY.

Witnesses:
F. L. COOK,
R. R. MURDOCK.